UNITED STATES PATENT OFFICE.

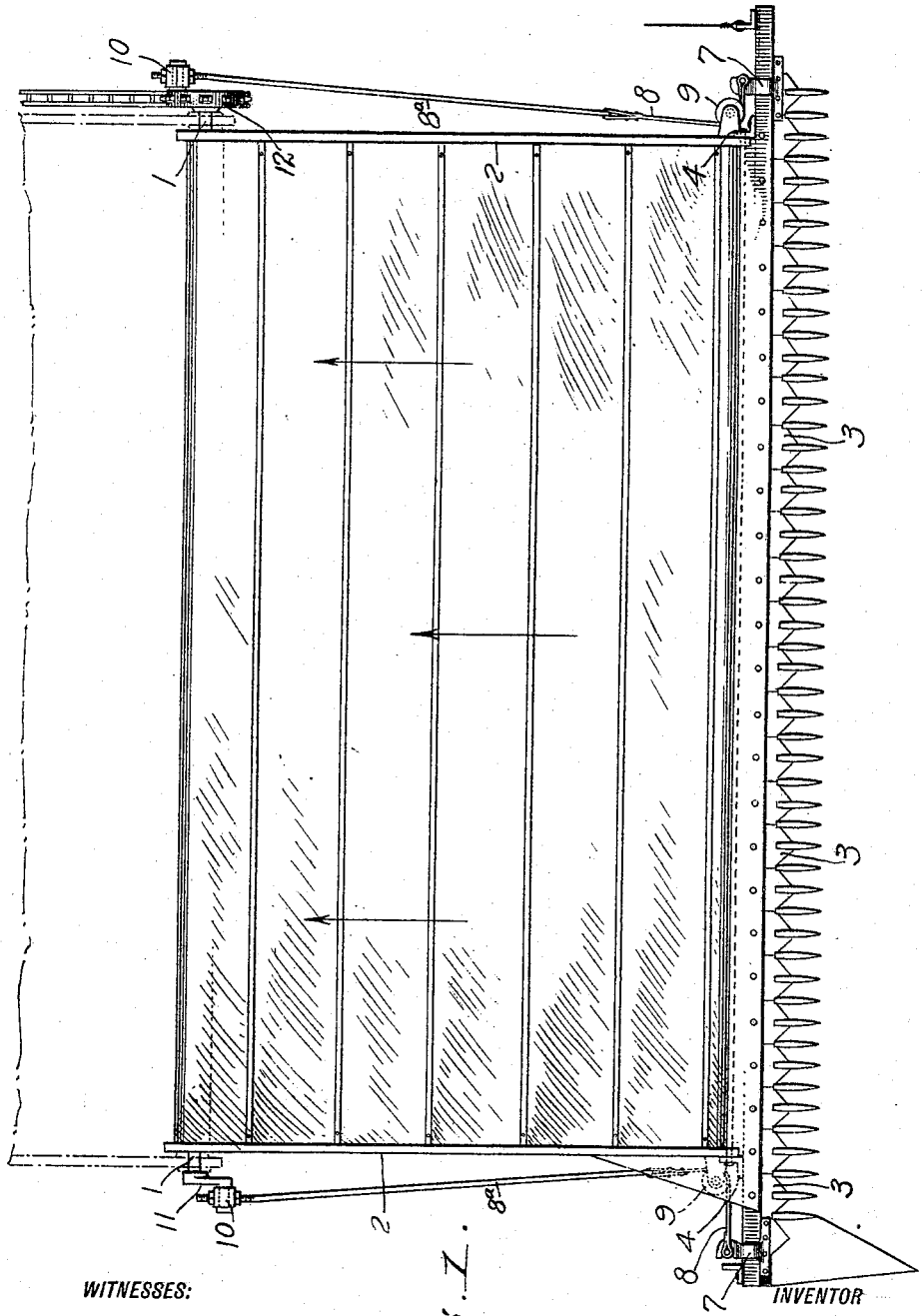

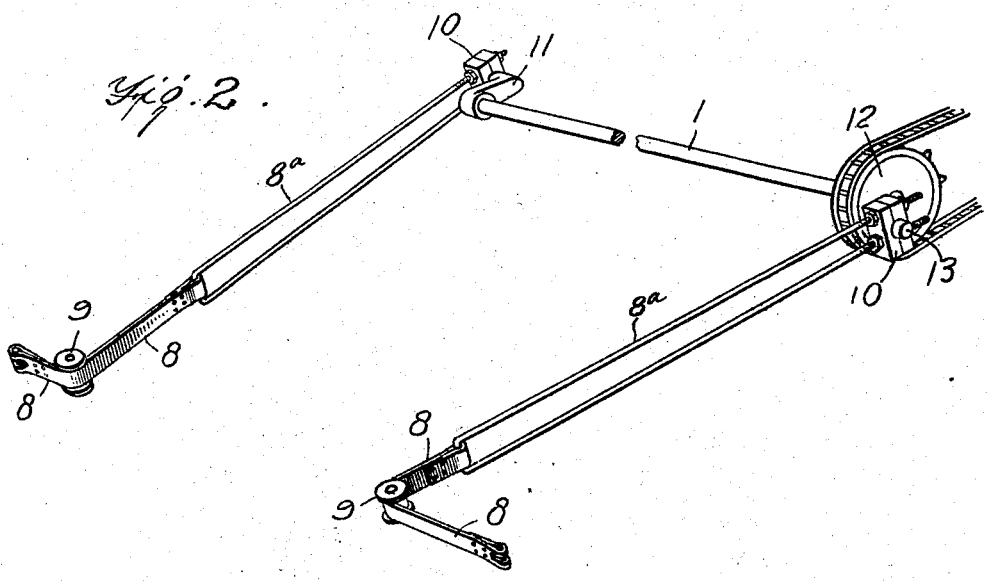

CORNELIUS QUESNELL, OF PORTLAND, OREGON.

SICKLE-DRIVE FOR HARVESTERS.

1,200,983.          Specification of Letters Patent.      Patented Oct. 10, 1916.

Application filed March 15, 1916. Serial No. 84,311.

*To all whom it may concern:*

Be it known that I, CORNELIUS QUESNELL, a citizen of the United States, and a resident of Portland, in the county of Multnomah and State of Oregon, have made an Improved Sickle-Drive for Harvesters, of which the following is a specification.

My invention is an improved mechanism for driving the sickle-blade or cutter of harvesters, particularly combined harvesters and threshers.

The details of construction, arrangement, and operation of parts are as hereinafter described, and illustrated in the accompanying drawings, in which;

Figure 1 is a plan view of my improved attachment combined with an ordinary draper. Fig. 2 is a perspective view of the mechanism constituting my invention.

1 indicates the shaft of the draper roller which is supported in boxing forming an attachment of the main frame of a thresher on which shaft the draper frame 2 is adapted to swing or rotate. The shaft 1 is driven by a suitable sprocket connection with the thresher mechanism proper. The sickle blade 3 is supported and adapted to reciprocate in a frame pivoted at the lower or outer end of the draper frame 2, as indicated at 4.

A T-shaped arm or bracket 7 is riveted to each end of the sickle blade and with their notched arms are detachably connected straps 8, which pass over pulleys 9 journaled at the lower ends of the draper frame 2. The other ends of said straps are attached to devices 8ª in the form of a loop or clevis whose threaded ends pass through boxings 10 applied, as best shown in Fig. 2, to the opposite ends of crank shaft 1. One terminal of said shaft is provided with a rigid crank 11, and the driving sprocket wheel 12 keyed on the other end of the shaft is similarly provided with a wrist-pin 13, and on these, namely, the crank and wrist-pin, the boxings 10 is secured.

As shown, nuts are applied to the ends of the loop or clevis 8ª by which means provision is made for stretching, or adjusting the tension of, the straps 8, as conditions require. The crank 11 and wrist-pin 13 are set in diagonally opposite relation to each other, so that as the shaft 1 is driven, the loops and straps will pull the sickle blade alternately in opposite directions, or in other words, reverse its stroke at each half rotation of the shaft 1. The mechanism for effecting this reversal of the blade is light, simple in construction, and efficient in operation, as well as easy to assemble and detach. Further, the flexibility of the strap connection practically "cushions" the sickle blade so that no jar or shock or noise is produced as when chains are employed in place of straps. It will be seen that the length of the cutting blade exceeds the distance between the rollers 9 so that the grass is always cut in the path of the latter.

I claim:

In a sickle-drive attachment of the type indicated, the combination with a reciprocable cutting blade, and a rotary shaft having cranks set opposite each other, of intermediate connecting devices consisting of U-shaped loops and flexible straps, the loops having means for adjusting the tension of the straps, and pulleys on which the straps run, as described.

CORNELIUS QUESNELL.

Copies of this patent may be obtained for five cents each, by addressing the "Commissioner of Patents, Washington, D. C."